(12) United States Patent
Keller

(10) Patent No.: US 6,244,846 B1
(45) Date of Patent: Jun. 12, 2001

(54) PRESSURE CONTAINMENT DEVICE FOR EVERTING A FLEXIBLE LINER

(76) Inventor: Carl E. Keller, P.O. Box 9827, Santa Fe, NM (US) 87504

(*) Notice: Subject to any disclaimer, the term of this patent is extended or adjusted under 35 U.S.C. 154(b) by 0 days.

(21) Appl. No.: 09/193,355

(22) Filed: Nov. 17, 1998

(51) Int. Cl.⁷ .................................................. B29B 15/00
(52) U.S. Cl. .............................. 425/11; 118/254; 156/287; 264/516; 405/146; 405/150.1; 425/59; 425/387.1; 425/503
(58) Field of Search .................................. 425/11, 59, 503, 425/387.1; 264/267, 269, 516, 570, 572; 118/254; 156/287, 254, 423; 405/146, 150.1

(56) References Cited

U.S. PATENT DOCUMENTS

| | | | |
|---|---|---|---|
| 4,350,548 | * 9/1982 | Zenbayashi et al. | 156/156 |
| 4,368,091 | * 1/1983 | Ontsuga et al. | 156/287 |
| 4,427,480 | * 1/1984 | Kamura et al. | 156/287 |
| 4,948,452 | * 8/1990 | Morinaga et al. | 156/382 |
| 5,154,936 | 10/1992 | Driver et al. | 425/182 |
| 5,167,901 | 12/1992 | Driver et al. | 264/570 |
| 5,176,207 | * 1/1993 | Keller | 425/387.1 |
| 5,203,996 | * 4/1993 | Scheucher et al. | 210/386 |
| 5,486,332 | * 1/1996 | Kamiyama et al. | 264/516 |
| 5,597,353 | 1/1997 | Alexander, Jr. | 166/64 |
| 5,803,666 | * 9/1998 | Keller | 405/146 |
| 5,816,345 | * 10/1998 | Keller | 175/53 |
| 5,975,878 | * 11/1999 | Wood et al. | 425/503 |

* cited by examiner

Primary Examiner—Nam Nguyen
Assistant Examiner—Emmanuel Luk
(74) Attorney, Agent, or Firm—Ray G. Wilson

(57) ABSTRACT

A pressure containment device enables the installation of an everting liner without requiring a shipping container that can be pressurized. A pressure housing provides an inlet for receiving the liner and an outlet for installing the liner into the borehole. First and second movable belts have first and second sealing surfaces, respectively, for receiving the liner at the inlet of the pressure housing, and first and second interior surfaces for urging the first and second sealing surfaces against the liner when the pressure housing is pressurized. First rollers support the first and second movable belts within the pressure housing.

3 Claims, 3 Drawing Sheets

PRESSURE CONTAINMENT DEVICE FOR EVERTING A FLEXIBLE LINER

FIELD OF THE INVENTION

This invention relates to everting flexible liners, and, more particularly, to everting liners from an unpressurized reel.

BACKGROUND OF THE INVENTION

Flexible borehole liners may be installed in vertical or horizontal boreholes, pipes, ducts, and the like, for a variety of applications. One application installs liners with instruments in vertical or horizontal holes for the purpose of making measurements. Another application uses liners to line and support boreholes during horizontal drilling operations. A third application installs liners in sewers and other piping to renew and/or seal internal surfaces.

In drilling boreholes for emplacement of measurement or sampling devices, the common practice is to install the desired device in the borehole and then to seal the hole with a grouted liner to fill the entire hole with a sealing material. U.S. Pat. No. 5,176,207, issued Jan. 5, 1993, to Keller, teaches the use of a flexible tubular member to both seal and support a borehole and to carry instruments into a borehole as the flexible member is everted into the borehole. Instrumentation and sampling devices can then be placed directly in contact with the surrounding structure.

The flexible liners are normally installed from the interior of a pressure canister into the hole. The pressure canister contains the liner and the fluid pressure used to evert the liner into the hole. For very deep holes, the necessary liner volume becomes very large and requires the construction of a prohibitively large and expensive pressure canister from which to deploy the liner.

This problem is addressed in U.S. Pat. No. 5,154,936; 5,167,901; and 5,597,353, which provide a sphincter-like feed-through to deploy a liner. The sphincter feed-through is not well suited to install essentially flat and relatively fragile liners with attached instruments, or to seal about very small objects passing through a large sphincter. In some applications, the liner is deployed directly from a tension control device, which operates on a flattened liner. An attached cord for control of the everting liner often follows the liner. It is difficult for the sphincter device to seal about such cords.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention is a pressure containment device for everting a liner. A pressure housing provides an inlet for receiving the liner and an outlet for installing the liner. First and second movable belts have first and second sealing surfaces, respectively, for receiving the liner at the inlet of the pressure housing, and first and second interior surfaces for urging the first and second sealing surfaces against the liner when the pressure housing is pressurized. First rollers support the first and second movable belts within the pressure housing.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

The present invention provides a means of everting and inverting very long liners without the use of a pressure canister for containment of the liner and for the control of the pressure applied to the interior of the liner during its installation. The liners can be installed directly from their shipping reel through this device. Yet the fluid pressure in the interior of the liner in the hole can be maintained high enough to force the liner into vertical or horizontal holes. The liners to be installed are relatively flat and often contain ports, tubing and other attachments for hole measurements. In some cases, the liners may be impregnated with uncured resins that are susceptible to being extruded from the liner material if not handled carefully when deployed into a pressurized volume from a lower pressure environment.

The main features of this invention are the pair of belts used to provide a seal of a system while still allowing a flat liner to be installed into a pressurized volume, and the surrounding sealing system used with those bells.

Figure 1:
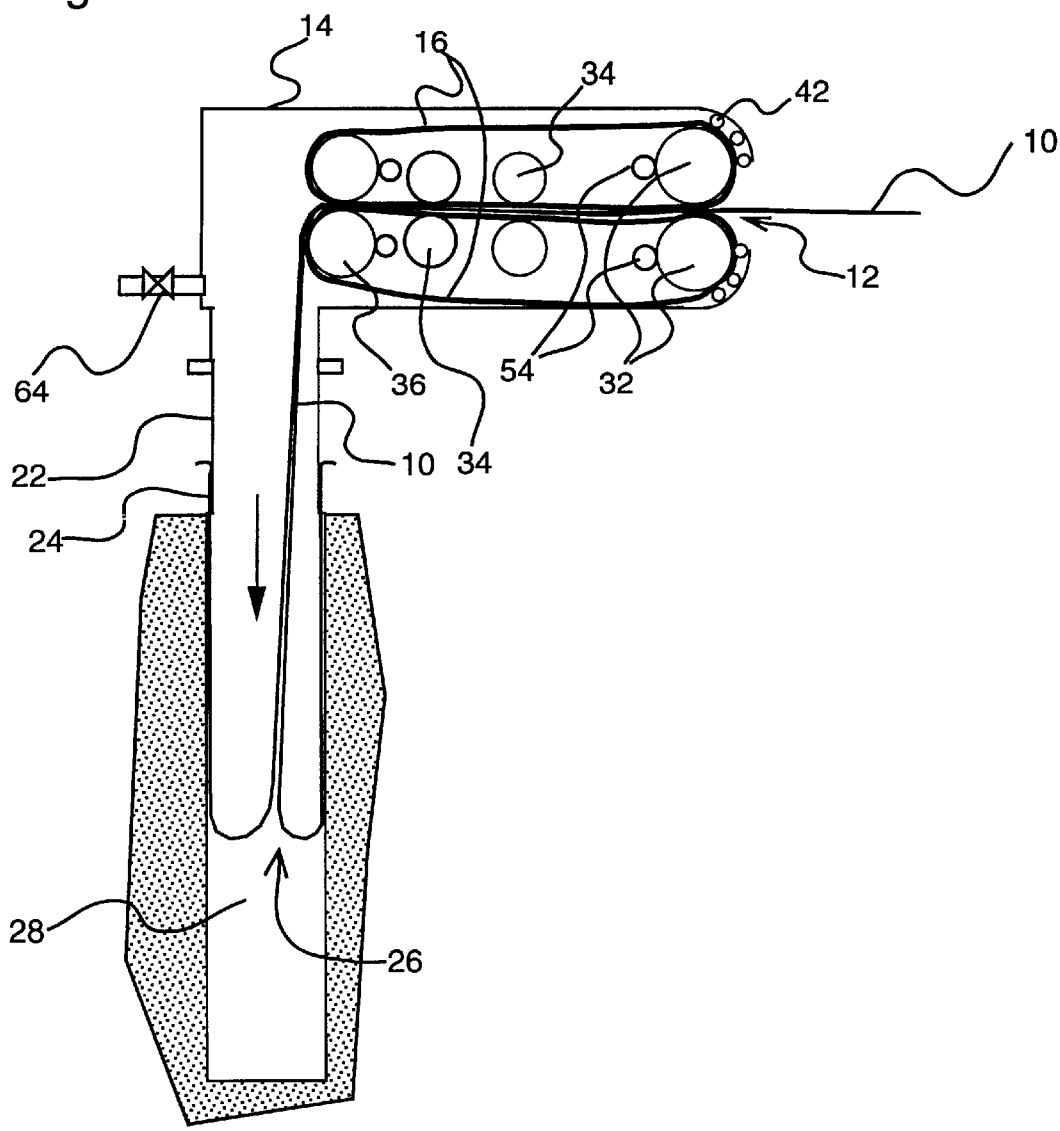
FIG. 1 is a side view of one embodiment of the present invention of a liner pressure control device.

Referring now to FIG. 1, liner 10 is deployed from a shipping container (not shown), e.g., a reel device, into the pressure containment device entrance 12 of housing 14. Liner 10 is fed between two belts 16 contained within housing 14. Belts 16 are moved via crank 18 (FIG. 4) that extends from housing 14 and may be manually operated or driven through a motor/gear mechanism (not shown). As liner 10 is threaded through belts 16 and out of exit 22, liner 10 is attached to entrance 24, by e.g., a clamp fastener or the like, to allow liner 10 to be everted 26 into an opening 28, such as a borehole, pipe, duct, or the like.

The interior of housing 14 is pressurized to force liner 10 to evert into the appropriate opening 28. As liner 10 is pulled through entrance 12 of housing 14 by the pressure against everting liner 26, belts 16 rotate on cylindrical roller pairs 32, 34 and 36. All of the rollers are mounted on axles with appropriate bearings to minimize friction in their rotation. Rollers 32 are the entrance rollers at entrance 12. Rollers 34 are for pressing edge portions of belts 16 together to reduce fluid leakage between the edges of the belts. The fluid pressure in housing 14 also serves to clamp belts 16 together at the edges to reduce the leakage between belts 16 and entrance 12.

Thus, the pair of belts 16 forms a flattened envelope of liner 10 which allows liner 10 to be fed into opening 28 with a minimum loss of the driving fluid from the opening. A major advantage of belts 16 as a feed-through device is that liner 10, which is normally in a flattened state on a shipping reel, can be deployed flat from the reel and flat into the opening 28. This allows only a minimum of leakage and a minimum of abrasion damage to liner 10. Liner 10 has a sealing coating on the outer surface (as wound on the reel), hence, the abrasion reduction is an important advantage. A third advantage of the belted feed-through is that the liner 10 often contains tubing and other hardware that causes irregularities in the cross section of the liner 10. Inflated front rollers 32 and the flexibility of belts 16 easily accommodate these irregularities. Third rollers 36 are primarily for the tension control of belts 16, which prevents belts 16 from being forced out of entrance 12 by the fluid pressure in housing 14. Third rollers 36 are also formed of an inflatable material.

Figure 2:
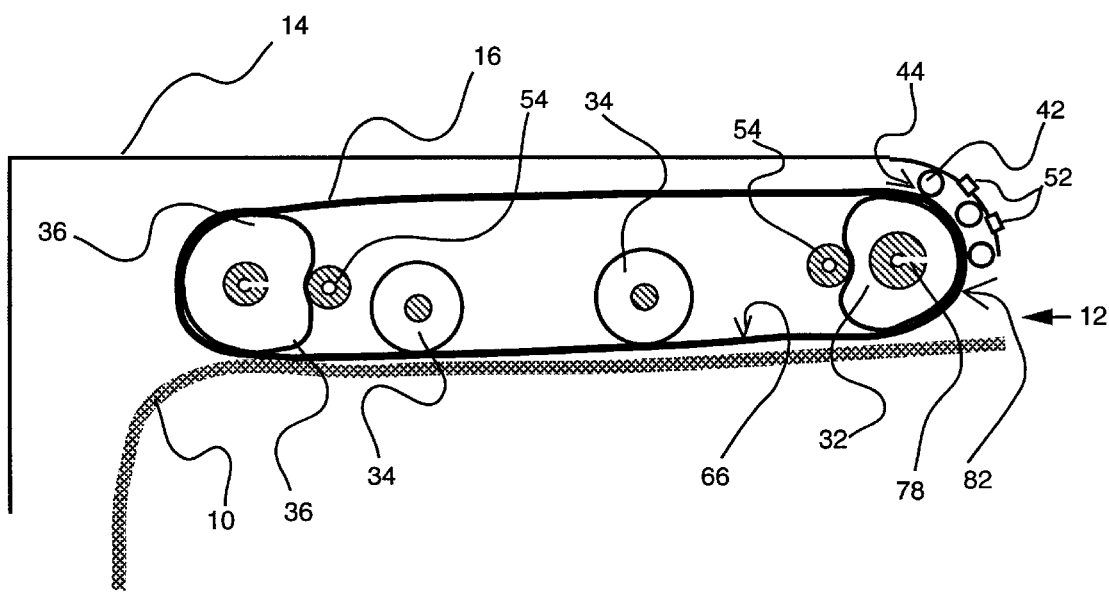
FIG. 2 is an enlarged cross-sectional view of the upper belt system shown in FIG. 1.
Figure 3:
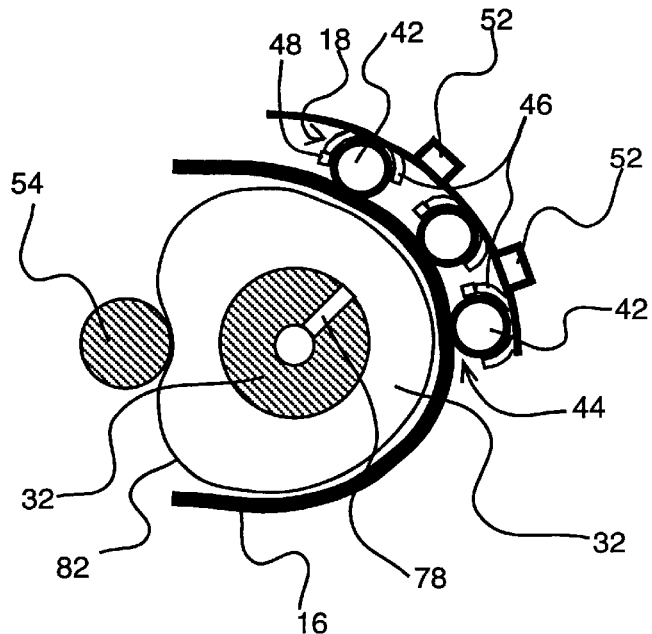
FIG. 3 is a further enlargement of the sealing mechanism of the upper belt system shown in FIG. 2.

Referring now to FIGS. 1, 2, and 3, another set of sealing rollers 42 reduces leakage past the outer surface 44 of belts 16, between belts 16 and device housing 14. Belt 16 is forced against the rollers 42 by the fluid pressure in housing 14 and by the pressure of inflated roller 32. This reduces the leakage path between outer surfaces 44 of belt 16 and sealing rollers 42. Outer flow path 18 around sealing rollers 42 is controlled by shrouds 46 and felt wiper strip 48 on shrouds 46. Any fluid leaking into the space between sealing rollers 42 and shrouds 46 is constrained to a slow net flow by the small passage, by felt strip 48, and by the fact that rollers 42 rotate in the opposite direction of the leakage flow while liner 10 is being deployed into opening 28. Sealing rollers 42 are held in shrouds 46 by the pressure of belt 16 against rollers 42 and, hence, sealing rollers 42 have no axles. This simplifies construction and provides the minimum clearance between sealing rollers 42 and shrouds 46. In that case, shrouds 46 are made of a low friction material, such as nylon, or the like.

Small adjustable pressure relief valves 52 are located between sealing rollers 42 to allow adjustment of the pressure drop between rollers to achieve an optimum seal by controlling the differential pressure forcing belt 16 against rollers 42. Another important factor is that adjustment of valves 52 is able to achieve a reasonable seal without excessive friction of rollers 42 against shrouds 46.

Roller pairs 32 and 36 are inflated to tension belt 16 and to urge belt 16 against sealing roller 42. Positioning rollers 54 prevent deflection of rollers 32 and 36 caused by the pressure of belts 16 against roller coverings 82. Roller 54 is supported by an axle fixed to the side panel of housing 14.

Figure 4:
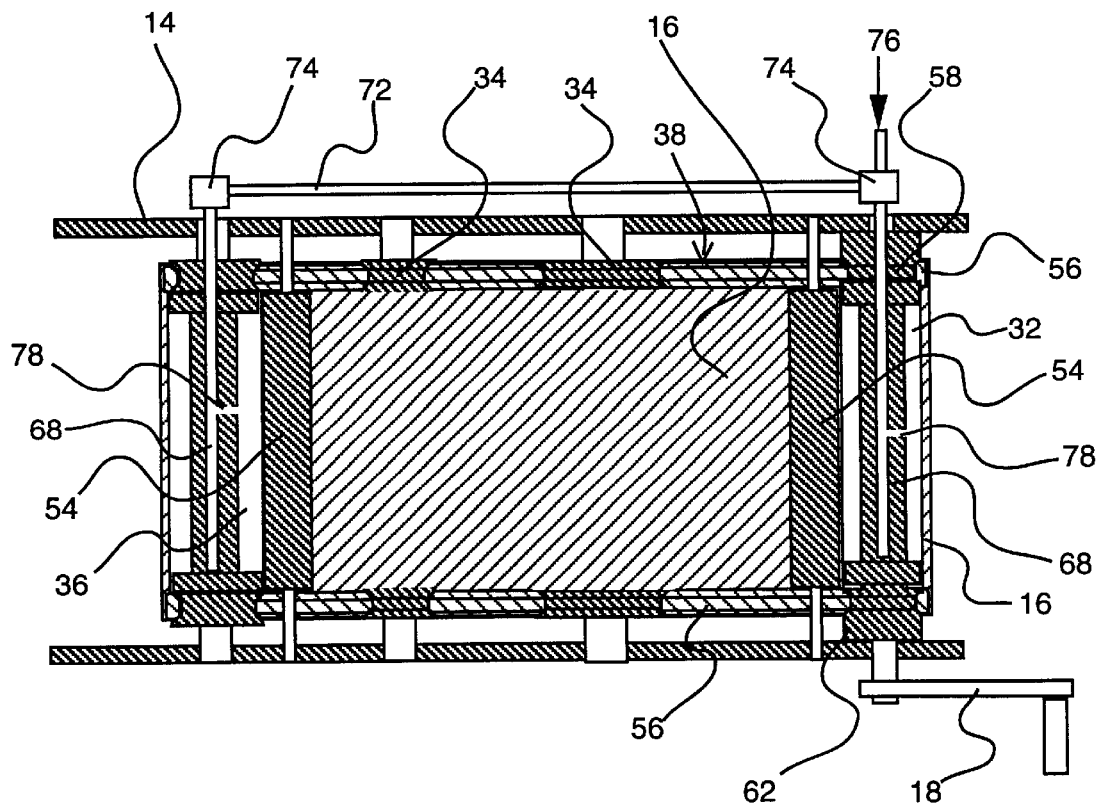
FIG. 4 is the top view of the upper belt system shown in FIG. 2.

As shown in FIG. 4, belt 16 can be formed with a typical vee belt shape 56 on its edges to better run in grooves 58 on the rollers. Vee belt edge 56 also prevents the deflection of belt 16 by liner 10 from causing greater leakage at the edge 38 of belt 16. Since belt 16 is captured in vee grooves 58 of front rollers 32, belt 16 must stretch slightly laterally to its axis to accommodate the deflection by liner 10. Belt 16 is preferably constructed with longitudinal strengthening tendons (not shown) to minimize the longitudinal stretch of belt 16 and to thereby provide better control of the ballooning of belt 16 out entrance 12 (FIG. 1). Tension rollers 36 prevent belts 16 from being distended at entrance 12 by the interior pressure of the device. Pressure rollers 34 also capture vee belts 56 at the edges of belts 16 in order to form a well-sealing shape of belts 16.

The ends of sealing rollers 42 are fitted close to device housing 14 to minimize leakage past the ends of sealing rollers 42. For that same reason, ends 62 of front rollers 32 are also fitted close to housing 14. Belts 16 are likewise fitted close to sealing rollers 42 and to entrance rollers 32 to reduce the leakage. An external device (not shown) provides the replacement fluid needed in the interior of housing 14 to maintain the pressure required via valved inlet 64. For an air driven system, a suitable device is a large air blower or compressor. For a liquid driven system, the fluid may be supplied by an ordinary pump such as a centrifugal pump operating at a set pressure.

Tubular system 72, shown in FIG. 4, provides a fluid pressure to the interior of rollers 32 and 36 via a rotating seal 74. The pressure applied through inlet 76 allows rollers 32 and 36 to be inflated via hollow axle 68 of rollers 32 and 36 and ports 78 into the interior of rollers 32 and 36. Inflatable covering 82 of rollers 32 and 36 urges belt 16 against sealing rollers 42. Inflatable coverings 82 of rollers 32 and 36 are maintained at a pressure adjustably greater than the pressure supplied in housing 14 at inlet 64 (FIG. 1). A pressure differential may be maintained by an adjustable valve (not shown) between inlet 76 and valve 64 (FIG. 1). An excess pressure aids rollers 32 and 36 to maintain a near cylindrical form and to more strongly urge belts 16 against sealing rollers 42.

In operation, the interior pressure of housing 14 forces belts 16 against their several sealing rollers 42 and liner 10. The higher the pressure, the greater the sealing force against sealing rollers 42 and liner 10. The same pressure on inner belt surfaces 66 forces upper and lower belts 16 toward each other. Liner 10 is contained between upper and lower belts 16 and allows some leakage along any interstitial spaces in the liner bundle. However, the small size of the interstitial spaces due to the pressure forcing upper and lower belts 16 together and the long flow path along upper and lower belts 16 keeps the leakage at a minimum. This long flow path is an important difference from a sphincter-type feed-through such as shown in U.S. Pat. No. 5,597,353. The encapsulation of liner 10 between belts 16 also allows better conformation to the flat geometry of the liners of interest.

A further refinement of the device would be to enable housing 14 to be opened along its horizontal midplane to allow liner 10 to be laid between belts 16 instead of the simple threading of liner 10 through belts 16 as liner 10 is installed into the device. This refinement is complicated by the seal required on the midplane of the device. It is noteworthy that the belt system is usually symmetric about the plane of the belt contact. However, that is not a requirement of the device to allow its function.

Applications

The pressure containment device described herein allows the deployment of borehole liners for a wide variety of applications. Liners can be deployed in confined borehole access situations, since the device has much smaller volume than the common pressure canister currently used to house and deploy the liner. The liner can be retrieved and wound on a reel with easy access to the liner as it passes onto the reel allowing manual control of the configuration on the reel to improve the reel capacity and to minimize potential damage to the hardware often attached to the liner. The liner can also be level wound on the reel by hand without a costly level winding mechanism otherwise required inside a pressure canister.

When used in conjunction with a tension control device between a shipping reel and housing 14, very long and heavy liners can be retrieved more safely from deep horizontal holes. Normally, the drag tension of the liner during retrieval compresses the liner badly on the reel inside a pressure canister. A tension control device allows the separation of the liner tension control from the leakage control required for everting liner installations and retrievals.

Installation of liners in very long slender holes for the purpose of towing instruments of various kinds requires the management of very long lengths of liners (e.g., 1600 ft. of 2 inch diameter tubular liner). The present device allows those long lengths to be controlled by hand, free of the restrictions of retrieval into a pressure canister. Also, multiple lengths of a liner may be serially attached to form the very long length since the liner can be accessed from outside the pressurized volume. Another advantage is the elimination of the hazard of large pressurized volumes of fluid in the pressure canister otherwise needed.

It is also possible with this device to deploy liners for greater distances in horizontal passages with many turns and the associated friction of dragging the liners into the holes. Many liners are deployed without the use of a pressure canister by using a liquid driver, e.g., simply pouring water into the liner as it everts downward into a hole. Those liners are too bulky and too long for use of a pressure canister of reasonable cost. If a greater pressure is needed, a vertical riser pipe is added to the hole entrance to achieve a greater head of water. The device of the present invention allows liquid-driven installations to be affected at a much higher driving pressure than can be practically attained by the hydrostatic water installation technique. Consequently, the liners can be installed in much longer continuous segments at less cost than piecemeal installations with the associated extra excavations required.

It is also expected that liners can be installed with this device with piping interior to the liner for the purpose of emplacement of the pipe into a horizontal hole formed by an appropriate means such as described in U.S. Pat. No. 5,816,345, issued Oct. 6,1998. The belts can be extended in length and formed of sufficiently elastic material that the belt conforms to the outer cylindrical shape of a pipe under the driving force of the interior fluid pressure in the device. It may be necessary to increase the roller diameters to accommodate the larger pipe diameter. Such piping can be installed with or without a surrounding liner. In that case, this device eliminates the need for the hose canister described in U.S. Pat. No. 5,803,666, issued Sep. 8, 1998, for use in augmentation of horizontal drilling. The liner and the attached pipe/casing can both be installed through this device to control the leakage of the driving fluid.

A cord is often attached to everting liners to facilitate their retrieval. As this cord follows the liner into the hole, the seal around the small cord is difficult with a large sphincter type of gland. However, the small cord is easily passed, with a good seal, between the pair of belts in this invention.

A further advantage of this device is that the liners passing between the belts are not sliding on the belts. This reduces the problem of wear that must accumulate in stationary sphincter type glands. The sliding seals of this system are mainly at machined surfaces such as the sealing rollers and the end seals of the front rollers. These are ordinary seals and seal materials and less likely to wear than the elastic orifice of a sphincter.

Although not shown, the leakage out of this device is replaced by an air blower (if air driven) or by a liquid pump (if a liquid system). If the liquid leakage is large, it can be collected within spray shields at the entrance and pumped back into the interior of the pressurized system.

The foregoing description of the pressure containment device according to the present invention for everting a very long liner into a borehole has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A pressure containment device for installing an everting liner comprising:

a pressure housing having an inlet for receiving said liner and an outlet for everting said liner;

first and second movable belts having first and second sealing surfaces, respectively, for receiving said liner at said inlet of said pressure housing, and first and second interior surfaces, respectively, opposed to said first and second sealing surfaces and subject to pressure within said pressure housing for urging said first and second sealing surfaces against said liner when said pressure housing is pressurized; and first rollers supporting said first and second movable belts within said pressure housing, wherein said first rollers include at least one inflatable roller for urging at least one of said first and second sealing surfaces toward said pressure housing.

2. A pressure containment device according to claim 1, further including second rollers contacting said first and second sealing surfaces and said pressure housing to form a pressure seal for said inlet of said pressure housing.

3. A pressure containment device according to claim 1, wherein said inflatable roller includes a rotating axle defining an internal passage for introducing a pressurized fluid within said inflatable roller.

* * * * *